April 2, 1935.  C. F. HIRSHFELD  1,996,512
SPRING DEVICE
Filed April 3, 1933
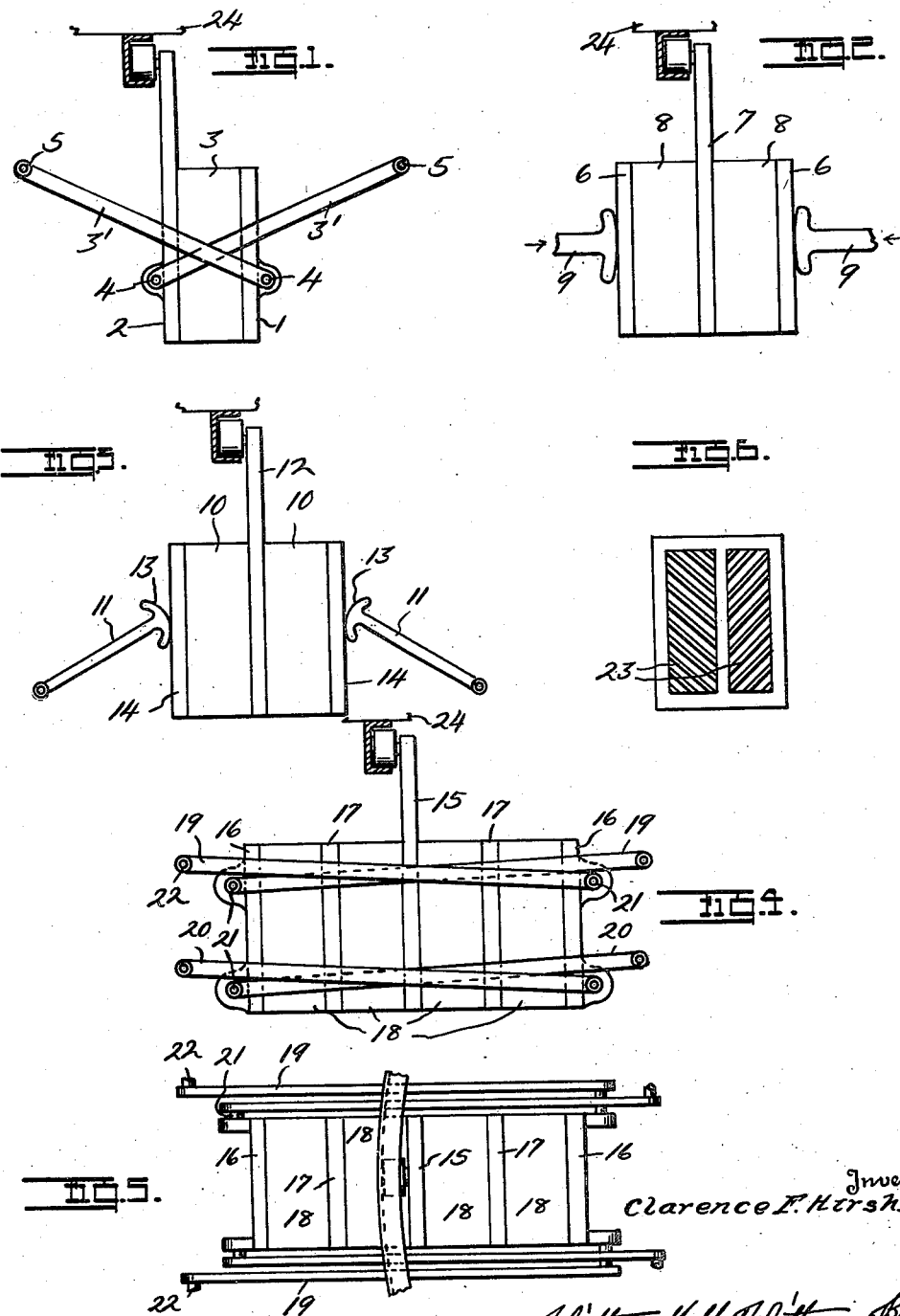
Inventor
Clarence F. Hirshfeld Patented Apr. 2, 1935

1,996,512

UNITED STATES PATENT OFFICE 1,996,512

SPRING DEVICE

Clarence F. Hirshfeld, Detroit, Mich., assignor to Thomas Conway, Jr., and Charles Gordon, co-trustees for Electric Railway Presidents' Conference Committee Application April 3, 1933, Serial No. 664,253

9 Claims. (Cl. 267—63)

This invention relates to spring devices and has for its object to teach a manner of increasing the apparent capacity of any spring device and particularly one employing rubber as its resilient element.

It is customary to load a spring device in one direction only and to compute its capacity by its ability to store energy under loading from this one direction. I have found, however, that it is possible, particularly where a yieldable material such as rubber is employed for resiliency, to apply loading forces in more than one direction and, by so doing, to increase its apparent capacity, that is, to obtain a new value for the capacity which is considerably in excess of that obtained when the force is applied in only one direction.

As an example, if a mass of rubber be submitted to a series of shearing forces and the values of each of the forces be plotted against each resultant deflection, a typical straight-line load deflection curve will be obtained. If, while the shearing forces are of any value up to and including the maximum of which the rubber is capable without destruction, other forces normal to the direction of the shearing forces be imposed on the rubber, the rubber loses in thickness in the direction of these other forces and a second load deflection curve, which is a typical compression curve, may be plotted. The shear load deflection curve is not substantially disturbed by the application of the compression nor, apparently, is there any substantial alteration of the compression curve because of the simultaneous shear load. The conclusion is that the capacity of rubber to store energy in one direction, as from a shearing load, is substantially, if not entirely, independent of its capacity to store energy in another direction, as from a compression load, and it is therefore another object of the invention to provide a spring device so arranged as to be capable of storing energy from loading imposed in more than one direction in order to better utilize the real capacity thereof.

A steel compression spring, for instance, has a typical load deflection curve which cannot ordinarily be altered in form. However, when employing rubber simultaneously in shear and in compression, as explained above, the load deflection curve of the spring device is a combination or compound of the shear and compression curves and this composite curve may be altered in form by changing the proportion of the loading borne in shear to that borne in compression. It is therefore a further object of this invention to provide a spring device which may be constructed and arranged in accord with any one of a wide range of load deflection curves, so as to satisfy the exigencies of a particular problem.

A further object of the invention is to provide a single load imposing member for storing energy in a spring device in two directions. More specifically, it is an object to employ the deflection of the spring device under a unidirectional loading to effect a primary and a secondary motion in the device, the secondary motion acting to store energy in a different direction from the primary. In carrying this into practice, I provide, as a prefered form, a so-called rubber sandwhich wherein rubber is placed between metallic plates, one of which plates is adapted to receive and to transmit a load to the ruber in shear. The metallic plates are floatingly supported in such manner that increasing increments of load cause the metallic plates to approach each other (as the secondary movement) and hence to impose increasing increments of compression on the rubber transversely to the direction of the application of the load. The two motions of the spring device thus occur simultaneously and both motions occur in accordance with the magnitude of the load. A single deflection curve which is the resultant of the two motions thus attains. The proportion in which the two motions occur and hence the load deflection ratio may be varied by varying the construction of the floating support. A simple construction is to employ criss-crossing links each pivotally connected at one end to one of the outside or end metallic plates and each pivotally connected at its other end to a remote supporting pin on the opposite side of the spring device, as hereinafter fully explained. The proportion of the two motions thus becomes dependent upon the length of the links and upon their original angularity with respect to the vertical.

It is a further object of the invention to provide a spring device including rubber and load receiving plates therefor which is capable of resisting a loading both by compression and shear and to employ the pressure imposed by that portion of the loading borne in compression as a means for increasing the frictional locking engagement of the rubber with its plates to resist relative displacement thereof by that portion of the loading borne in shear. Thus, I not only obviate slippage, but ready disassembly of the spring device becomes a matter of relieving the rubber of all loading by releasing the links from their supports.

It is a still further object of the invention to provide a vehicle bolster spring device constructed in accordance with the above objects.

Other objects either directly described or indirectly accruing from the favorable relation of parts will become hereinafter more fully apparent, as reference is had to the accompanying drawings, wherein my invention is illustrated by way of example and not in a limiting sense, and in which Figure 1 is a side elevation of a spring device showing an embodiment of my invention;

Figures 2, 3 and 4 are similar views showing other embodiments of my invention;

Figure 5 is a plan view of Figure 4;

Figure 6 is a detail view.

As shown in Figure 1, 1 and 2 are respectively the supporting or load receiving and the supported or load imposing members of the spring device, these members being metallic plates which are substantially parallel to each other and which, in the present instance, extend vertically. 3 is the mass or block of rubber forming the resilient cushioning element of the spring device and located between the plates.

The plates and cushioning element are at all times maintained in compressed assembly, the plates being urged toward each other to impose an initial compression on the cushioning element with a continuous pressure over extended areas thereof of sufficient magnitude to set up a frictional lock against slippage of the cushioning element relative to the plates without other bonding means under normal operation of the spring device. As a result, the parts may be readily disassembled. In operation, the cushioning element is subjected to loading in a direction substantially normal to the direction of the clamping force exerted by the plates and, therefore, this cushioning element is subjected to pure shear stresses. The load is unidirectional and, in the present instance, the load acts vertically downwardly upon the upper end of the supported plate 2 and this plate transmits the loading imposed thereon to the cushioning element in shear.

The supported plate 2, in addition to storing energy in the cushioning element in shear, stores energy in this cushioning element by compression, the arrangement being such that the forces for storing energy in the cushioning element in shear and by compression act from different directions angularly disposed with respect to each other.

The structure for accomplishing these results comprises the criss-crossing links 3' each pivotally connected at one end to one of the plates by the pin 4 and at the other end to a remote supporting pin 5 on the opposite side of the spring device. The axes of the pins 4 and also the axes of the pins 5 are respectively in the same horizontal planes and the links 3 are of the same length and preferably extend from the pins 5 at a downward inclination to the pins 4 and these parts are so arranged that the plates 1 and 2 exert the above mentioned initial compression upon the cushioning element. Furthermore, the arrangement is such that the links form a floating support and upon downward movement of the load imposing plate 2 under load and consequent deflection of the cushioning element in shear and movement of the load imposing plate 2 relative to the supporting or load receiving plate 1 these links cause the plates to travel toward each other to increase the pressure on the cushioning element.

Thus it will be seen that the cushioning element resists the loading imposed thereon by both shear and compression resulting from forces acting from different directions angularly disposed with respect to each other, so that the value for the capacity of the cushioning element is considerably in excess of that obtained when the force is applied in one direction only. It is to be noted that the shear forces, either linear or rotative, may be applied in any direction in the plane of shear, this being particularly true in bolster spring devices. Furthermore, since the compression on the cushioning element increases as the shear, the frictional locking engagement of the cushioning element with the plates is increased to more positively obviate slippage of the cushioning element with respect to the plates.

Since the capacity of the cushioning element to store energy in one direction as from a shearing load is substantially, if not entirely, independent of its capacity to store energy in another direction as from a compression load and since the load deflection curve of the spring device is a combination or compound of the shear and compression curves, this curve may be readily changed by changing the proportion of the loading borne in shear to that borne in compression and more particularly by varying the lengths of the links 3 and their normal or original angularity in the spring device.

In the embodiment of my invention shown in Figure 2, the spring device has the pair of outer supporting or load receiving plate members 6, the intermediate supported or load imposing plate member 7 and the masses or blocks of rubber 8. These masses or blocks of rubber form the resilient cushioning elements and they are located at opposite sides of the plate member 7. In this modification, the means for compressing the cushioning elements is independent of the plate member 7, so that the storing of energy in the cushioning elements by compression is independent of the storing of energy in the cushioning elements in shear by the plate member 7. In detail, the means for compressing the cushioning elements comprises the plungers 9 which extend horizontally and are opposed to each other and are located to engage the outer sides of the outer plate members 6.

The embodiment of my invention as shown in Figure 3 differs essentially from that shown in Figure 2 in that the means for compressing the cushioning elements 10 which are also formed of blocks or masses of rubber comprises the cam members 11. These cam members are opposed to each other and symmetrically arranged with respect to the supported or load imposing plate 12. Each cam member has the cam face 13 engaging the outer face of an outer supporting or load receiving plate member 14 and each cam member is preferably inclined downwardly and outwardly and pivotally mounted at its end opposite to the cam face. With this construction it will be seen that the cushioning elements resist the loading imposed thereon by both shear and compression.

Figures 4, 5 and 6 disclose another embodiment of my invention in which 15 is the supported or load imposing plate member, 16 are the outer supporting or load receiving plate members and 17 are intermediate plate members, all being substantially parallel and preferably extending vertically. Between the adjacent plate members are the blocks or masses of rubber 18 forming the cushioning elements. Pivotally connected to the upper and lower portions of the outer plate members are the criss-crossing links 19 and 20 respectively, each of which is inclined upwardly from the pin 21 pivotally connecting the same to its plate member to the remote supporting pin 22 on the opposite side of the spring device. The pins 21 and 22 of each pair of links have their axes respectively in the same horizontal planes and the links of each pair are of the same length. These links in the normal position of the spring device urge the outer plate members toward each other to impose an initial compression on the cushioning elements of sufficient magnitude to set up a frictional lock against slippage of these cushioning elements relative to the plate members without other bonding means. However, as shown more particularly in Figure 6, all of the plate members of the spring device have their surfaces which are adapted to contact with the resilient cushioning elements provided with the corrugations 23, preferably of the herringbone type, which serve to maintain the cushioning elements in place during assembly of the spring device and further serve as an additional safety factor in preventing relative slippage of the cushioning elements and plate members, especially in constructions where the shear load increases at a faster rate than the compression load.

This construction operates in much the same manner as that disclosed in Figure 1, but, in addition, has a number of advantages, such as that of preventing tilting of the supported or load imposing plate member when a large amount of rubber is used and also preventing tilting of the spring device itself by reason of maintaining the outer plate members parallel at all times.

The above spring devices are adapted particularly for use with bolsters of street cars and the like which are designated by the reference character 24, the bolster in each modification being operatively connected to and, as shown, adapted to abut the upper end of the supported or load imposing plate member which extends above the supporting or load supporting plate member or members.

What I claim as my invention is:

1. In combination, a supporting member, a supported member, yieldable means for resisting relative movement in one direction between said members by resilient shear and means associated with each of said members for bodily moving the same in a transverse direction for applying a variable compressive force to said shear means during relative movement between said members.

2. In a spring device, a plurality of metallic plate members arranged in pairs, each pair of said members having a mass of rubber therebetween, one of said members upon movement thereof in one direction transmitting a loading imposed thereon to said rubber in shear, and means for urging all of said plate members bodily in a transverse direction toward each other with increasing force as the shear loading on said rubber increases.

3. In a spring device, a plurality of metallic plate members arranged in pairs, each pair of said members having a mass of rubber therebetween, one of said plate members being adapted for receiving and for storing the energy of a loading in said rubber partially in shear, the other of said plate members being pivotally supported to float from points of support remote therefrom, said other plate members travelling toward each other in an amount proportionate to the deflection of said rubber under shear whereby the remainder of the energy of said loading is stored in said rubber by compression.

4. In a spring device, a plurality of metallic plate members arranged in pairs, each pair of said members having a mass of rubber therebetween, one of said members constituting a load receiving member, the outer or end members being pivotally attached to links pivotally supported at points on opposite sides thereof whereby the arcs described by said plates in swinging about said points tend to intersect, said load imposing members upon receiving a load imposing a shear loading on said rubber, said outer plates upon deflection of said rubber under shear swinging toward each other on arcs having said links as radii whereby increasing increments of load are resisted by increasing increments of shear and compression in said rubber.

5. In combination, a supporting member, a supported member, yieldable means between said members for resisting relative movement thereof in one direction by resilient shear, means for imposing an initial compression on said yieldable means by said members, and means for bodily moving said members in a transverse direction for increasing the compression on said yieldable means with increasing relative movement of said members in the first mentioned direction, said yieldable means and said members being urged together at all times with sufficient force to set up a frictional locking engagement therebetween whereby relative slippage is prevented.

6. In combination, a spring device and a floating support for said spring device, said support in response to a deflection of said spring device from a loading in one direction being adapted to move in the same direction to alter the angularity of the load deflection curve of said spring device according to the magnitude of such movement, said floating support also having a further simultaneous bodily movement angularly disposed to the direction of deflection of said spring device from said one direction for causing a different deflection thereof and for storing energy in said spring device in the direction of said further movement, said support by its further movement altering the form of the load deflection curve of said spring device.

7. In a spring device, a plurality of plate members, a mass of rubber therebetween, one of said plate members transmitting a loading imposed thereon to said rubber in shear, and means for bodily urging said plate members toward each other with increasing force as the shear loading on said rubber increases.

8. In combination, a supporting member, a supported member, a resilient cushioning element between said members, said supported member being adapted to receive and store the energy of a loading in said cushioning element partially in shear, and pivotal means supported at points spaced from said members for urging said members toward each other whereby the remainder of the energy of the loading is stored in said cushioning element by compression.

9. In a spring device, a plurality of plate members, a resilient cushioning element between said plate members, one of said plate members being adapted to receive and store the energy of a loading in said cushioning element partially in shear, and pivotal means supported at points spaced from said plate members for urging said plate members toward each other, whereby the remainder of the energy of the loading is stored in said cushioning element by compression.

CLARENCE F. HIRSHFELD.